United States Patent [19]

Leutz

[11] 4,279,746
[45] Jul. 21, 1981

[54] HYDRAULIC FLUID FILTER AND BYPASS VALVE

[75] Inventor: Donald C. Leutz, Sylvania, Ohio

[73] Assignee: Parker-Hannifin Corporation, Cleveland, Ohio

[21] Appl. No.: 114,029

[22] Filed: Jan. 21, 1980

[51] Int. Cl.³ ............................................ B01D 27/10
[52] U.S. Cl. ................... 210/130; 137/543.15; 137/543.23; 210/420
[58] Field of Search ............... 210/130, 131, 232, 236, 210/420, 423, 424; 137/543.15, 524, 543.23

[56] References Cited

U.S. PATENT DOCUMENTS

| 3,156,259 | 11/1964 | Havelka et al. | 210/130 X |
| 3,314,542 | 4/1967 | Kudlaty | 210/236 |
| 3,618,776 | 11/1971 | Kudlaty | 210/130 |
| 3,640,390 | 2/1972 | Gor et al. | 210/130 |
| 3,819,052 | 6/1974 | Firth | 210/131 X |
| 4,081,379 | 3/1978 | Smith | 210/232 |
| 4,142,973 | 3/1979 | Kachman | 210/90 |
| 4,192,750 | 3/1980 | Elfes | 210/232 X |

OTHER PUBLICATIONS

Parts List For BFT Filters, Schroeder Bros. Corp., McKees Rocks, Pa., 1 Sheet 10/1972.

Primary Examiner—John Adee
Attorney, Agent, or Firm—Joseph B. Balazs

[57] ABSTRACT

A tubular filter assembly having a mount for the filter element which positions the element both axially and radially and allows axial replacement thereof through a removable end wall of the filter housing. The inward end of the filter element is slidably supported on a fixed end wall boss. A bypass valve is retained in the mount in a compact arrangement with a portion of the valve within the filter element and removable therewith. In a preferred embodiment the bypass valve is a glass-filled nylon, reversible, snap-in poppet valve assembly which is usable in different filter configurations.

10 Claims, 4 Drawing Figures

HYDRAULIC FLUID FILTER AND BYPASS VALVE

BACKGROUND OF THE INVENTION

This invention relates to a hydraulic fluid filter assembly and more particularly to a mounting device for positioning a filter element in a predetermined location within the filter housing as well as a reversible, poppet type bypass valve which is usable with the assembly in either forward or reverse flow filter embodiments.

Filter assemblies of a generally tubular configuration having a removable end wall are well-known in this art and provide the advantage of easy access to the interior of the filter housing for replacement of the filter element therein or for other servicing reasons. It is typical of devices of this type, however, that one end of the filter element is supported on a central structural support, which also might support a bypass valve therewith, the latter being used for routing fluid around the filter element upon a build-up of contaminants therein. Such typical structure is depicted in U.S. Pat. No. 3,618,776 and it is apparent in such arrangement that there is little tolerance for variations in axial dimensions and that the central part of the filter element is obstructed to a degree by the central mounting posts. Further, a machined head is used as the closure member, this being a relatively heavy and expensive structure which is machined to fit the housing and which is tapped for receipt of the central support post.

A different approach to mounting the filter element in a filter housing is shown in U.S. Pat. No. 3,640,390 wherein a spider assembly is employed at one end of a filter element which together with a central compression spring at the other end serves to support the element within the filter housing. In this arrangement the entire filter housing is supported on and positioned relative to a threaded central fluid port. The position of the filter element with respect to the housing is substantially fixed and is dependent upon support provided at the inside diameter of the filter element. The support structure in this instance also houses a bypass valve therein and is removed with the filter element for replacement purposes.

Still another filter assembly of the removable end wall type is shown in drawing No. D-2692 of Schroeder Brothers Corporation, which shows a spring biased mount which engages the inside diameter of the filter element and supports a bypass valve therewith. Sealing engagement with the filter element is made at the axial ends thereof and a relatively cumbersome head casting structure is employed.

A still further showing of a filter assembly with removable end structure is that of U.S. Pat. No. 4,142,973, showing as well a bypass valve of a particular configuration for providing an electrical indication of a valve open condition, thus indicating a contaminated filter element. In this arrangement the bypass valve is radially oriented in a head casting of the filter assembly at a position in line with the inlet port. The filter assembly is apparently designed only for unidirectional fluid flow.

SUMMARY OF THE INVENTION

The present invention provides an efficient and simplified fluid filter assembly of the removable end wall type which is capable of great versatility in accommodation of forward and reverse fluid flows. The assembly includes a bypass valve therein which is inserted by a simple push-in and twist, snap-fit arrangement, and is similarly readily removable. The valve is insertable in a mounting aperture in either a forward or reverse direction and includes reversible components so as to be responsive to forward or reverse flow conditions.

A spider type mounting member supports the filter element at the outside diameter at one end thereof, and positions same radially within the filter housing at a predetermined axial distance from the removable end wall. Spring means at the other end of the housing bias the filter element and mount into engagement with the end wall so that the mount is positioned relative to the housing and to a radially oriented access port. A four-leg spacer arrangement on the mount provides a relatively unobstructed peripheral area for fluid flow at the outside of the filter element and yet assures a three-point mounting support in engagement with the inner wall of the filter housing for coaxial positioning of the filter element at the location of the outlet port.

The snap-in type bypass valve assembly provides a reversible structure wherein the poppet, central support pin, and spring biasing means may be reversed as well as the bypass valve mount containing the valve seat thereon for either forward or reverse flow operation at the same mounting location.

DETAILED DESCRIPTION OF THE DRAWINGS

Figure 1:
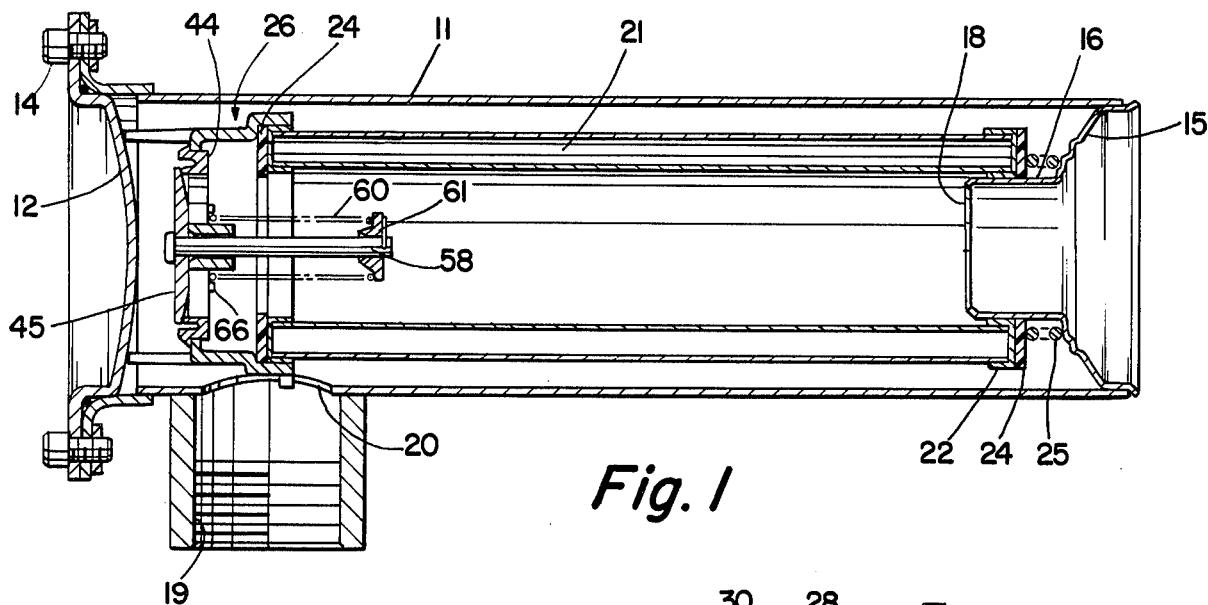
FIG. 1 is a longitudinal sectional view of a preferred embodiment of filter assembly having the bypass valve assembly therein in a first flow direction.

Referring now to the drawings, FIG. 1 is a sectional view of the filter assembly 10 of the invention which consists of a tubular metal housing 11 having a first end at which an end cover 12 is removably attached by means of bolts 14, and a remote end which includes a closure member 15 consisting of a generally conical shell-like member terminating in a tubular boss portion 16, the closure member 15 being welded or otherwise secured to the tubular housing 11. In this embodiment of the invention the end wall of the closure member 15 is open forming an inlet port 18 to the housing 11. An outlet port 19 consisting of a radially disposed tubular member is welded at the first end of the housing 11 providing communication with the interior by way of aperture 20 in the housing 11.

A typical tubular filter element 21 is described, which may be one of many similar types of filter elements, typically being a folded paper structure secured at either end by means of a metal end cap 22, each end having an annular elastomeric seal 24 which extends radially over the end and a short distance axially within the element 21. This type of filter element 21 is reversible in the filter assembly 10. The filter element 21 is supported at one end on boss 16 of the closure member 15, being biased to the left as viewed in FIG. 1 by compression spring 25 surrounding the boss. A fluid seal is effected between the inner peripheral surface of the seal 24 and boss 16.

Figure 2:
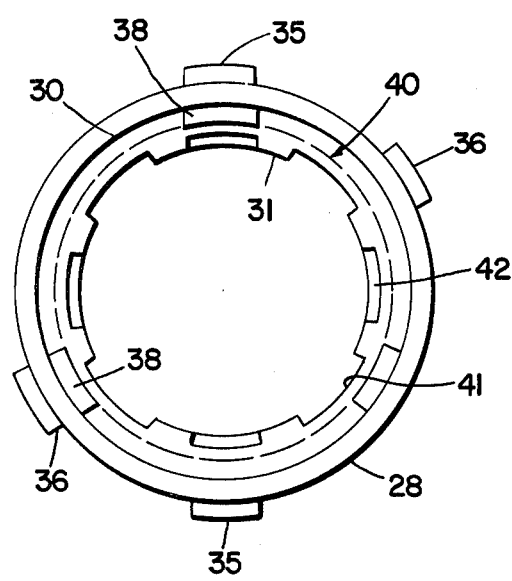
FIG. 2 is an end view of the filter element mount taken from the removable end wall end of the filter housing of FIG. 1 with the bypass valve mount and valve assembly removed.

A filter element mount 26 is provided at one end of the filter assembly for support of the filter element 21. The filter mount 26 is seen in greater detail in enlarged showings, in end view in FIG. 2, and in section in FIG. 4. The mount 26 consists generally of a unitary cup-shaped support 28, formed preferably of glass-filled nylon, having a generally cylindrical wall with an enlarged diameter seat 29 at one end thereof for receipt of the filter element 21 and a transverse end wall 30 having a large aperture 31 therein for receipt of a bypass valve assembly 32.

A first spacer means consisting of four spacer legs 35, 36 project radially from the periphery of the seat 29 at one end of the support 28. The legs have curved outer surfaces and are dimensioned so that the support 28 is a sliding fit within tubular housing 11 and so that the support 28 is centrally supported therein. The spacer legs 35, 36 are oriented in pairs such that each of the legs is diametrically opposite another of the legs and that the pair of legs 35 is disposed at an angle of approximately 45° with respect to the other pair of spacer legs 36. As noted in FIG. 1 it will be seen that the filter mount 26 is disposed axially within the tubular housing 11 at a location adjacent aperture 20 in communication with the outlet port 19. So long as the aperture 20 spans less than 45° of included angle at least three of the spacer legs 35, 36 will be in engagement with the inside diameter of the housing 11 to provide a three point support for the filter element mount 26.

The radial dimension and arcuate length of each of the legs 35, 36 is such as to provide a relatively unobstructed and sufficiently large annular fluid passage between the outside of the mount 26 and the inside of the housing 11, so as not to restrict fluid flow through the filter. In the embodiment of filter depicted in FIG. 1, such fluid flow is from inlet port 18, into the center of filter element 21, then radially outwardly to the annular space thereabout and then to the outlet port 20 so long as the valve in the bypass valve assembly 32 is closed. Contamination of the filter element 21 causes increased pressure difference across the bypass valve, cracking same and allowing a more direct flow of fluid to outlet port 20. With reversed fluid flow utilizing the bypass valve configuration depicted in FIG. 4, fluid flow is from port 20, from the periphery of the filter element 21 to the interior thereof and then out port 18, with the bypass valve creating a direct axial path through the center of the element, when the valve is opened due to element contamination.

The second spacer means forming a part of the filter element mount 26 consists of three equally spaced axially extending projections of the side wall of the support 28 constituting further spacer legs 38 which engage end cover 12 when such is positioned on the housing 11 to locate the filter element mount 26, as seen in FIG. 1, approximately at the axial location of the outlet port 19. Spring 25 acts between closure member 15 and element 21 to urge the mount 26 to the left, the axial legs 38 and radial legs 35 cooperating wth the end cover 12 and housing structure to concentrically align the element 21 within the housing 11. The end cover 12 is dished at the center primarily to reduce trapped air inside the filter.

End wall 30 of mount 26 includes a part of interengaging means or snap-fit device 40 thereon, which in part, consists of circumferentially spaced notches 41 interspersed with detent means 42 which are adapted to accommodate portions of the bypass valve assembly 32 to retain the latter securely in position within the filter element mount 26 and with a portion thereof within the filter element 21. Four notches 41 and four detent means 42 of approximate equal circumferential extent are equally spaced about the inner diameter of end wall 30. The detent means 42 consist of arcuate depressions in the end wall 30 having an arcuate ramp surface thereon and include such depressions on axially opposed surfaces of the end wall 30 so as to provide a means for reversible engagement of the bypass valve assembly 32 upon insertion of the latter from either end of the filter element mount 26.

Figure 4:
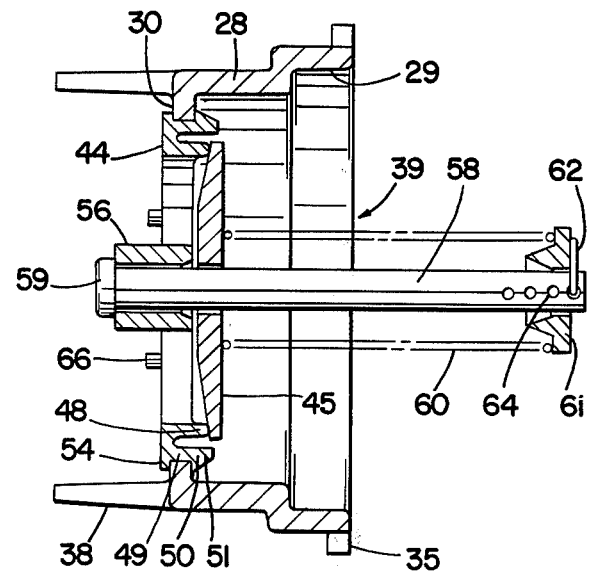
FIG. 4 is an enlarged elevational view in section of the filter element mount of FIG. 1 with a reversed bypass valve mount and bypass valve assembly therein.
Figure 3:
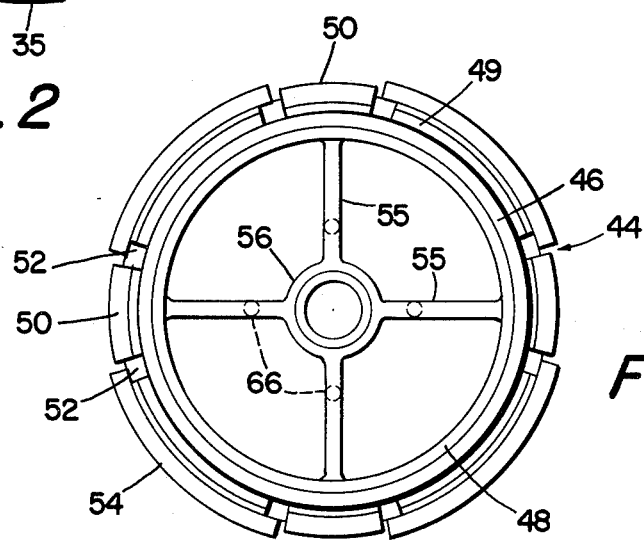
FIG. 3 is an end view of the bypass valve mount taken from the removable end wall end of the filter assembly of FIG. 1 with the filter element mount and the bypass valve poppet removed.

As seen in more detail in plan view in FIG. 3 and in section in FIG. 4, recalling that the bypass valve assembly 32 is shown in reverse position in the latter, the valve assembly 32 consists of a bypass valve mount 44 and valve poppet 45 which serves to open and close the path of fluid flow through the central portion of the filter element mount 26 and thus through the one end of the filter element 21.

Bypass valve mount 44 is a unitary structure, again preferably formed of glass-filled nylon, consisting of a generally annular transverse wall 46 having an axially raised annular valve seat 48 thereon at the inner edge and an axially raised outer wall 49. The latter is sized in diameter to fit snugly within the aperture 31 of the filter element mount 26 to provide a relatively fluid-tight connection therebetween. The wall 49 is continuous at the lower portion thereof to provide a seal with the I.D. of the end wall 30 but is axially extended at its upper portion in four locations to form the axially extending retainer legs 50 forming a part of the snap-fit device 40. Each of the legs 50 has a head 51 thereon adapted to pass through the notches 41 in the filter element mount 26 and then to be rotated until engaged in the mating detent notches 42, providing a snap engagement therewith. The underside of each of the heads 51 of the retainer legs 50 is arcuately shaped to match the slope of the ramp of the detent depressions 42 so that a stable interconnection is achieved. The upper side of each head 51 is tapered in the axial direction to facilitate engagement with the mount 28.

Notches 52 are included in the upper portion of the end wall 49 adjacent each of the retainer legs 50 to provide added resilience to the latter to assist in the interengagement thereof with the filter mount 26. Extending outwardly from transverse wall 46 is peripheral ledge 54, formed at those locations intermediate the retainer legs 50 and serving to engage the underside of transverse wall 30, thus with the underside of the heads 51 of retainer legs 50, providing axially opposed surfaces, gripping the transverse wall 30.

The central portion of the bypass valve mount 44 is essentially open providing a path for fluid flow through the center thereof but includes therein a spider arrangement consisting of four radial arms 55 which coaxially support a central sleeve or boss 56 which extends in an axial direction and depends in part below the surface of the transverse wall 46 of the mount 44. Slidably received and supported in sleeve 56 is pin 58 providing support for the poppet 45 and other components of the poppet valve assembly 32.

In the reverse flow embodiment of the invention depicted in FIG. 4, pin 58 is supported in sleeve 56 and is fixed against movement relative to bypass valve mount 44 by means of engagement of the head 59 of pin 58 with sleeve 56. Poppet 45 consisting of a generally disc-shaped member having a tapered seating surface is slidably supported on pin 58 at a central hole therein, and is biased into engagement with valve seat 48 by means of compression spring 60. Spring 60 bears against the upper face of the poppet 45 and is supported at the remote end of the pin 58 by retainer 61, in turn secured by spring clip 62 passing through one of the cross holes 64 in the pin 58. Such arrangement provides an adjustment for the bias of spring 60 upon poppet 45 to control the pressure level at which the poppet is lifted from the valve seat 48.

In the embodiment of the invention shown in FIG. 1 bypass valve mount 44 is supported in filter element mount 26 such that the valve seat 48 is at the end of the filter housing 11 which is closed by end cover 12. Sleeve 56 supports pin 58, in this arrangement the pin 58 being movable relative to the support 44 and securing poppet 45 against the valve seat by means of the head of pin 58. In this arrangement bias is again provided by spring 60 acting between retainer 61 and bypass valve mount 44, being guided by axially disposed projections 66 integrally formed on the lower portion of the radial arms 55 of the bypass valve mount 44. In the arrangement of the invention seen in FIG. 1 it will be apparent that as a contaminated condition of the filter element 21 occurs increased fluid pressure within the element will act upon the under side of poppet 45 to lift same from the valve seat and open a route of communication to outlet port 19. Normal fluid flow which is from inlet port 18 through the periphery of the filter 21 into the annular space between the element 21 and the housing 11 will then be bypassed direction to outlet port 19. The resilience afforded by the glass-filled nylon structure of the filter element mount 26 and the bypass mount 44 allows for effective sealing between the elements themselves and the filter element as well as providing a suitable structure for support of the filter element without being particularly susceptible to fracture thereof due to vibrations encountered under typical operating conditions.

Removal of the filter element is readily accommodated by means of removal of end cover 12. Filter element 21 and the filter element mount 26 are urged outwardly of the housing 11 by means of bias spring 25 such that the element can be easily grasped and changed. Reinsertion of the element 21 is effected by assembling same with mount 26 and with aid of the end cover 12 urging the element 21 into location upon the support boss 16 at the remote end of the housing. Filter element mount 26 will position the filter element 21 both radially and axially in the filter housing 11 against the action of compression spring 15.

What is claimed is:

1. In combination in a tubular filter housing having a removable end wall at one end through which a tubular filter element may be moved for replacement purposes and means at the other end of said housing adapted for receipt and axially biased support of the remote end of said filter element concentrically within said filter housing, a filter element mounting device for support of the proximate end of said filter element, comprising an integral cup-shaped holder having a cylindrical wall and a transverse end wall, an enlarged diameter seat formed in said cylindrical wall for removably receiving and supporting said filter element at the periphery thereof, first spacer means on said holder extending radially outwardly from said cylindrical wall and sized for a sliding fit in engagement with said filter housing, said first spacer means being sized to form a substantially unobstructed annular passage about said holder and to position said holder substantially radially equidistantly within said filter housing, second spacer means on said holder extending axially outwardly therefrom into engagement with said removable end wall of said filter housing, said second spacer means being sized to position said holder at a predetermined axial location within said housing, said first and second spacer means cooperating with said filter housing and said removable end wall, respectively, to retain said filter element concentrically within said filter housing and an aperture in said transverse end wall for receipt of a valve element within said holder.

2. The combination set forth in claim 1 wherein said means for support of the remote end of said filter element comprises a boss and spring means on said boss for urging said filter element into said cup-shaped holder and said second spacer means into engagement with said removable end wall.

3. The combination set forth in claim 2 wherein said filter housing includes a radially disposed outlet port at said one end thereof, said second spacer means being sized to position said first spacer means at said outlet port, and said first spacer means comprises four spacer legs positioned about the periphery of said holder so that at least three of said legs engage the inner surface of said housing for radial support of said filter element.

4. The combination set forth in claim 3 wherein said spacer legs comprise two pair of spacer legs, each of said legs being disposed diametrically opposite another leg, and said pairs of legs are disposed at an angle less than 90° with respect to each other.

5. The combination set forth in claim 3 wherein said spacer legs are at one end of said holder and said second spacer means is at the other end of said holder and said transverse end wall of said holder is therebetween.

6. The combination set forth in claim 5 wherein said second spacer means comprises three axially disposed legs extending beyond said transverse end wall of said holder and dimensioned to provide a relatively open space for fluid flow between said holder and said removable end wall.

7. The combination set forth in claim 1 wherein said valve element is a bypass valve having a mount which is reversible and includes engaging means for mounting in either orientation in said holder, and said bypass valve is reversible to control flow of fluid in either direction through said filter element.

8. The combination set forth in claim 7 wherein said engaging means of said bypass valve mount comprises snap-fit interengaging means for push-in mounting of said bypass valve and said bypass valve is a spring-biased poppet valve having means for adjustment of the spring tension thereon.

9. A reversible poppet valve assembly for fluid filters and the like comprising a disc-like support having an axially raised circular valve seat thereon, an aperture in said support within said valve seat, a circular poppet adapted for seating engagement with said valve seat for closing said aperture therein, a sleeve integral with said support, centrally located within said aperture supported on arms extending radially between said sleeve and said support, a shaft slidably mounted in said sleeve and passing through a central opening in said poppet for supporting said poppet for closing and opening movement toward and away from said valve seat, a head on one end of said shaft, a spring retainer secured at the other end of said shaft and a compression spring concentrically positioned on said shaft and in engagement with said spring retainer for resiliently urging said poppet toward said valve seat, said shaft being reversible in said sleeve, and retainer means at the periphery of said support for releasably securing said support in an aperture in a generally planar body member, said support being reversible in said body member for controlling fluid flow through said body member in either direction, said retainer means comprising a peripheral ledge on said support engageable with one side of said body member and a plurality of axially extending retainer legs spaced about the periphery of said support, said legs thereon adapted to pass through notches formed in the periphery of the aperture of said body member and having surfaces thereon engageable with the other side of said body member upon partial rotation of said support to a position where said legs are intermediate the notches, thereby to secure said support in said body member.

10. The valve assembly set forth in claim 9 wherein said spring retainer is slidable on said shaft and further including means on said shaft for adjusting the position of said spring retainer thereon, thereby to adjust the bias of the compression spring.

* * * * *